US008340578B2

(12) United States Patent
Tolentino et al.

(10) Patent No.: US 8,340,578 B2
(45) Date of Patent: Dec. 25, 2012

(54) METHODS AND APPARATUS FOR ENHANCED COEXISTENCE ALGORITHMS IN WIRELESS SYSTEMS

(75) Inventors: Jaime Tolentino, Sunnyvale, CA (US); Camille Chen, Cupertino, CA (US); Michael Jason Giles, San Jose, CA (US); Huy Le, Milpitas, CA (US); Gary Thomason, Boulder Creek, CA (US); David A. Hardell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 536 days.

(21) Appl. No.: 12/573,755

(22) Filed: Oct. 5, 2009

(65) Prior Publication Data

US 2011/0081858 A1 Apr. 7, 2011

(51) Int. Cl.
*H04B 7/00* (2006.01)
(52) U.S. Cl. .................. 455/41.2; 455/63.1; 455/552.1; 455/553.1; 455/513; 370/338; 370/352; 709/203; 375/285
(58) Field of Classification Search ............... 455/41.2, 455/63.1, 552.1, 513, 553.1; 370/338, 352; 709/203; 375/285
See application file for complete search history.

(56) References Cited

U.S. PATENT DOCUMENTS

| | | | | |
|---|---|---|---|---|
| 6,978,121 B1 * | 12/2005 | Lane et al. | .................. | 455/73 |
| 7,146,133 B2 * | 12/2006 | Bahl et al. | .................. | 455/63.1 |
| 7,181,182 B2 * | 2/2007 | Cha et al. | .................. | 455/278.1 |
| 7,200,376 B2 * | 4/2007 | Cha et al. | .................. | 455/275 |
| 7,657,411 B2 * | 2/2010 | Poetsch et al. | .................. | 703/6 |
| 7,813,295 B2 * | 10/2010 | Trachewsky | .................. | 370/252 |
| 7,949,364 B2 * | 5/2011 | Kasslin et al. | .................. | 455/552.1 |
| 2006/0209763 A1 | 9/2006 | Emeott et al. | | |
| 2008/0026718 A1 | 1/2008 | Wangard et al. | | |
| 2008/0069063 A1 * | 3/2008 | Li et al. | .................. | 370/338 |
| 2008/0080455 A1 * | 4/2008 | Rofougaran | .................. | 370/342 |
| 2009/0176454 A1 * | 7/2009 | Chen et al. | .................. | 455/63.1 |
| 2009/0285167 A1 * | 11/2009 | Hirsch et al. | .................. | 370/329 |
| 2011/0019561 A1 * | 1/2011 | Yun et al. | .................. | 370/252 |

FOREIGN PATENT DOCUMENTS

| | | |
|---|---|---|
| EP | 1 838 040 | 9/2007 |
| WO | WO 2008/034038 | 3/2008 |
| WO | WO 2009/055714 | 4/2009 |

* cited by examiner

*Primary Examiner* — Marceau Milord
(74) *Attorney, Agent, or Firm* — Gazdzinski & Associates, PC

(57) ABSTRACT

Methods and apparatus for mitigating the effects of interference between multiple air interfaces located on an electronic device. In one embodiment, the air interfaces include a WLAN interface and PAN (e.g., Bluetooth) interface, and information such as Receiver Signal Strength Index (RSSI) as well as system noise level information are used in order to intelligently execute interference mitigation methodologies, including the selective application of modified frequency selection, variation of transmitter power, and/or change of operating mode (e.g., from multiple-in multiple-out (MIMO) to single-in, single-out (SISO)) so as to reduce isolation requirements between the interfaces. These methods and apparatus are particularly well suited to use cases where the WLAN interface is operating with high data transmission rates. Business methods associated with the foregoing technology are also described.

21 Claims, 10 Drawing Sheets

METHODS AND APPARATUS FOR ENHANCED COEXISTENCE ALGORITHMS IN WIRELESS SYSTEMS

RELATED APPLICATIONS

This application is related to co-owned and co-pending U.S. patent application Ser. No. 12/006,992 filed Jan. 7, 2008 and entitled "Methods and Apparatus for Wireless Device Coexistence"; Ser. No. 12/082,586 filed Apr. 11, 2008 entitled "Methods And Apparatus For Network Capacity Enhancement For Wireless Device Coexistence"; and Ser. No. 12/215,574 filed Jun. 26, 2006 entitled "Methods and Apparatus for Antenna Isolation-Dependent Coexistence in Wireless Systems", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to wireless communications system using multiple air interfaces and multiple antennas.

2. Description of Related Technology

Wireless connectivity is becoming ubiquitously available and necessary in electronic computing, information, and entertainment products. Presently, many electronic products such as mobile phones, computers, media players, etc. come equipped with one or more wireless networking or communication interfaces.

In many cases, these communication interfaces may include both wired and wireless network interfaces. Wireless network interfaces, also called "air interfaces", are of increasing interest due to the mobility and freedom they afford a user. Exemplary wireless networking technologies include Wi-Fi (IEEE Std. 802.11a/b/g/n), WiMAX (IEEE Std. 802.16e, etc.), PAN (IEEE Std. 802.15), IrDA, ultra-wideband (UWB), Mobile Wideband (MWBA; IEEE-Std. 802.20), Bluetooth (BT), and others.

Many popular electronic devices now also utilize multiple air interfaces in ways where interference between these air interfaces can cause problems with the function or "user experience" (i.e., user enjoyment or perception of functionality) of the device. One common implementation for portable electronic devices is the simultaneous use of Wi-Fi and BT air interfaces or radios, which operate in overlapping frequency bands. Accordingly, when a WLAN 802.11b/g/n and BT radio are integrated in a personal electronic device, and because these two radios share the same frequency band (i.e., the Industrial, Scientific and Medical (ISM) band of 2.4-2.48 GHz), there is interference between the radios when they operate simultaneously. However, BT was designed with the possibility of radio interference in mind, and utilizes algorithms that are adapted to mitigate the effects of EMI or external emissions, including a feature known as adaptive frequency hopping (AFH), described in greater detail subsequently herein.

Traditionally, as long as the WLAN and BT modules have over 40 dB isolation and the aforementioned BT AFH algorithm is implemented properly, in most cases the interference between WLAN and BT is not very noticeable, and the user experience for WLAN and BT simultaneous operation is reasonable, especially in cases where the isolation is sufficiently large (e.g., >35 db between the first and second air interface antennae).

However, with the evolution of new applications for these wireless systems, as well as shrinking system form factors, existing methodologies and algorithms are becoming increasingly insufficient. For example, most prior art WLAN usage cases were for downloading; e.g., receiving email, web surfing, and streaming audio/video applications. Accordingly, for the majority of the time, WLAN was used almost exclusively for receiving data, thereby resulting in a lower probability of interference between the WLAN module (i.e., during WLAN transmissions) and the BT module that is mostly used in a receiving mode. This results from the fact that most common implementations for BT in portable computing devices are for a BT human interface device (HID), such as a mouse (MS), touch pad, headset, and/or keyboard (KB).

More recently, manufacturers have fielded products which provide increasing amounts of usage for the transmit side of the portable device's WLAN module than had been previously experienced in prior implementations. For example, the Assignee hereof has developed products such as Apple TV™ and Apple Time Capsule™, which, in combination with a user's existing computing device(s), increase usage of WLAN transmit functions. As illustrated in FIG. 1, a user of a computing device 100 (such as for example the MacBook Pro™ device), might have his/her software storage application (e.g., Time Machine™) upload files to a remote Wi-Fi capable storage device 110 (e.g., such as their separate Time Capsule hardware), while simultaneously utilizing a BT MS/KB 120 as the default HID. In addition, when utilized with external displays, such as Apple's LED Cinema Display, the computing device 100 (if a laptop computer), is often operated in its clamshell mode (i.e., closed) which tends to negatively affect isolation between the two antennas.

As a result of this increased amount of usage on the transmit side of the WLAN interface (and/or decreasing levels of isolation in certain operational modes), the probability of interference from the WLAN 115 (e.g. during transmitting or sync-up of files sent to the storage device 110, etc., as shown in FIG. 1) affecting BT operation 125 (e.g. receiving from the MS/KB periodically, etc.) increases. In the aforementioned exemplary scenario, a WLAN and BT antenna isolation of 40 dB provided using only the default BT AFH is no longer sufficient to provide an acceptable user experience. In other words, users will start to notice a significant degradation in service quality, which can manifest itself for instance as jerkiness or other undesired motion or artifact when utilizing a BT MS.

The foregoing problems are yet further exacerbated by the push towards smaller form factors (thereby tending to reduce isolation), as well as packaging with less-than-ideal materials for wireless system implementation (such as the metallic housing or case structures), thereby complicating efforts to increase isolation between wireless network interfaces in the foregoing use cases.

Moreover, battery-powered BT peripheral devices are constrained on their power use. Poor isolation can lead to the increase of BT transmission power (e.g. from class 2 to class 1) and potentially an increased number of BT data retransmissions, both of which result in shorter battery life and decreased levels of user satisfaction.

Despite a variety of attempts to address interference associated with multiple air interface co-existence evidenced in the prior art (including the aforementioned BT AFH scheme, transmitter power control schemes based entirely on RSSI (Receiver Signal Strength Index), and so-called "time sharing" approaches described in greater detail below), there is a salient need for improved methods and apparatus that provide additional robustness against interference in systems that operate in historically untraditional ways. Specifically in the context of the aforementioned WLAN transmission usage case, there is a need for a solution which addresses poor user experience with one or more air interfaces. Ideally, such a solution will also address situations that are highly space-constrained or otherwise necessarily result in low isolation values between the antennae of the various air interfaces of the platform (for example, WiFi/WLAN and Bluetooth, WiMAX and Bluetooth, WLAN and UWB).

Such an improved solution would ideally permit for good user experience by avoiding significant audio or data dropouts; prevent the appearance of adverse effects on data streaming rate; avoid the preclusion of use of one interface when another is being used; and be absent of any significant operation restrictions with respect to the multiple air interfaces by allowing two or more interfaces to operate simultaneously in at least a partial capacity. Furthermore, such a solution would still obey the platform or form-factor limitations such as those present in extremely small hand-held or laptop computing devices, or those with metallic cases which inherently present challenges to antenna placement.

SUMMARY OF THE INVENTION

The present invention satisfies the aforementioned needs by providing improved apparatus and methods for air interface coexistence.

In a first aspect of the invention, a method for reducing interference in a wireless coexistence system is disclosed. In one embodiment, the wireless coexistence system includes two differing wireless network interfaces that operate in at least a partially overlapping frequency band. The method includes determining a receiver signal strength index (RSSI) at the wireless coexistence system; determining a noise floor associated with the wireless coexistences system; and implementing a coexistence algorithm to reduce interference in the wireless coexistence system based at least in part on the determined RSSI and determined noise floor.

In one variant, the coexistence algorithm adjusts the frequency utilization of one of the two differing wireless network interfaces.

In another variant, the coexistence algorithm adjusts the transmitter power of a transmitting one of the wireless network interfaces.

In yet another variant, the coexistence algorithm imposes a data rate mask or limitation on a transmitting one of the two wireless network interfaces.

In yet another variant, the two wireless interfaces comprise a WLAN interface and a Bluetooth interface. Furthermore, the act of implementing a coexistence algorithm comprises adjusting a channel map associated with an adaptive frequency hopping function of the Bluetooth interface.

In yet another variant, the adjusted channel map adjusts selected frequencies of the map to maintain an increased frequency difference from a frequency associated with the WLAN interface relative to that of the adaptive frequency hopping function without such an adjustment.

In a second embodiment, the method comprises determining a receiver signal strength index at one of the interfaces and based on the determined receiver signal strength index, selecting one of two different frequency use maps for a first of the two interfaces; and determining a noise value associated with the wireless coexistence system and based on the determined noise value, selecting one of a plurality of operating modes of operation of a second of the two interfaces, the selected mode adjusting the transmit power of the second interface.

In one variant of the second embodiment, the selected mode comprises a single-in single-out (SISO) mode of operation, while the other operating mode comprises a multiple-in multiple-out (MIMO) mode of operation.

In another variant of the second embodiment, at least one of the two different frequency use maps maintains an increased frequency difference from a center frequency associated with a first wireless interface relative to that of another one of the two different frequency use maps.

In yet another variant of the second embodiment, the increased frequency difference from the center frequency is greater than 22 MHz for at least a portion of one of the two different frequency use maps.

In a second aspect of the invention, a wireless device is disclosed. In one embodiment, the wireless device includes a processing apparatus; at least two differing wireless network interfaces that operate in at least a partially overlapping frequency band, at least one of the at least two differing wireless network interfaces operates according to a multiple-in multiple-out (MIMO) protocol. The wireless device further includes a computer readable apparatus having a storage medium with at least one computer program having a plurality of computer executable instructions that when executed by the processing apparatus: determine whether the wireless device is in an environment in which a first threshold for a system noise floor is exceeded and if so, adjust a transmit power for at least one of the differing wireless network interfaces. In addition, the wireless device determines whether it is in an environment in which a second threshold for the system noise floor is exceeded; and if so, turns off at least one channel associated with the wireless network interface operating according to the MIMO protocol.

In one variant, the differing wireless interfaces include a WLAN interface and a Bluetooth interface. Furthermore, the computer program is further configured to: measure a received signal strength using at least one of the interfaces; evaluate the measured signal strength using one or more criteria; and based at least in part on the evaluation, implement a modified adaptive frequency management protocol.

In another variant, the computer program is further configured to: utilize an adjusted channel map associated with an adaptive frequency hopping function of the Bluetooth interface.

In yet another variant, the adjusted channel map includes an adjusted portion of selected frequencies to maintain an increased frequency difference from a center frequency associated with the WLAN interface relative to that of the adaptive frequency hopping function without such adjustment.

In yet another variant, the computer program is further configured to adjust the frequency utilization of at least one of the two differing wireless network interfaces.

In a second embodiment, the wireless device comprises a processing apparatus; at least two differing wireless network interfaces that operate in at least a partially overlapping frequency band; and a computer readable apparatus having a storage medium with at least one computer program stored thereon. The computer program includes computer executable instructions that when executed by the processing apparatus: determine whether one of the at least two wireless network interfaces has a receiver signal strength index (RSSI) that exceeds a first criterion and if so, read a first frequency utilization map for the one of the at least two wireless network interfaces. Otherwise the computer program is configured to read a second frequency utilization map for the one of the at least two wireless network interfaces. In addition, the computer program is configured to determine whether the wireless device is in an environment in which a first threshold for a system noise floor is exceeded and if so, adjust a transmit power for at least one of the two differing wireless network interfaces. If the transmit power is adjusted, the computer program is configured to determine whether the wireless device is in an environment in which a second threshold for the system noise floor is exceeded; and if so, modify the operation of one of the two differing wireless network interfaces.

In one variant, the modified operation comprises turning off at least one channel associated with the wireless network interface operating according to a MIMO protocol.

In another variant, the modified operation comprises further adjusting the transmit power for the at least one of the two differing wireless network interfaces.

In a third aspect of the invention, a method of operating a device is disclosed. In one embodiment, the method includes a device having first and second air interfaces and operates to mitigate interference therebetween without imposing time-sharing restrictions on either of the interfaces by determining a received signal strength using at least one of the interfaces; determining a noise parameter using at least one of the interfaces; and based on the acts of determining, selectively implements a frequency use mapping for the first interface that substantially avoids one or more emitted sidebands associated with transmission from the second interface.

In one variant, the first interface comprises a PAN interface, the second interface comprises a WLAN interface, and the frequency use mapping comprises a mapping which allows only certain prescribed channels.

In another variant, the method further determines the noise parameter once again after selectively implementing a frequency use mapping. This noise parameter is evaluated and based at least in part on the evaluation, the method implements at least one of: (i) transmitter power reduction on the WLAN interface; and/or (ii) changing the mode of operation of the WLAN interface from multiple-in, multiple-out (MIMO) to single-in, single-out (SISO).

In a second embodiment, the method reduces the isolation requirements between the first and second interfaces through selective use of (i) frequency mapping for the first interface; (ii) change in transmitter power for the second interface. The selective use is based in part on both signal strength and noise floor measurements within or proximate to the device.

In a fourth aspect of the invention, a method of operating a MIMO-capable air interface of a device is disclosed. In one embodiment, a noise parameter is evaluated and based at least in part on this evaluation, the method implements at least one of: (i) transmitter power reduction on the WLAN interface; and/or (ii) changing the mode of operation of the WLAN interface from multiple-in, multiple-out (MIMO) to single-in, single-out (SISO).

In a fifth aspect of the invention, a computer readable apparatus having a storage medium is disclosed. In one embodiment, the computer readable apparatus includes a computer program comprising computer executable instructions that when executed by a processor, determine whether the wireless device is in an environment in which a first threshold for a system noise floor is exceeded and if so, adjust a transmit power for at least one of the at least two differing wireless network interfaces. The computer program is further configured to determine whether the wireless device is in an environment in which a second threshold for the system noise floor is exceeded; and if so, turn off at least one channel associated with the at least one wireless network interface operating according to the MIMO protocol.

In a sixth aspect of the invention, a method of doing business relating to a wireless device is disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
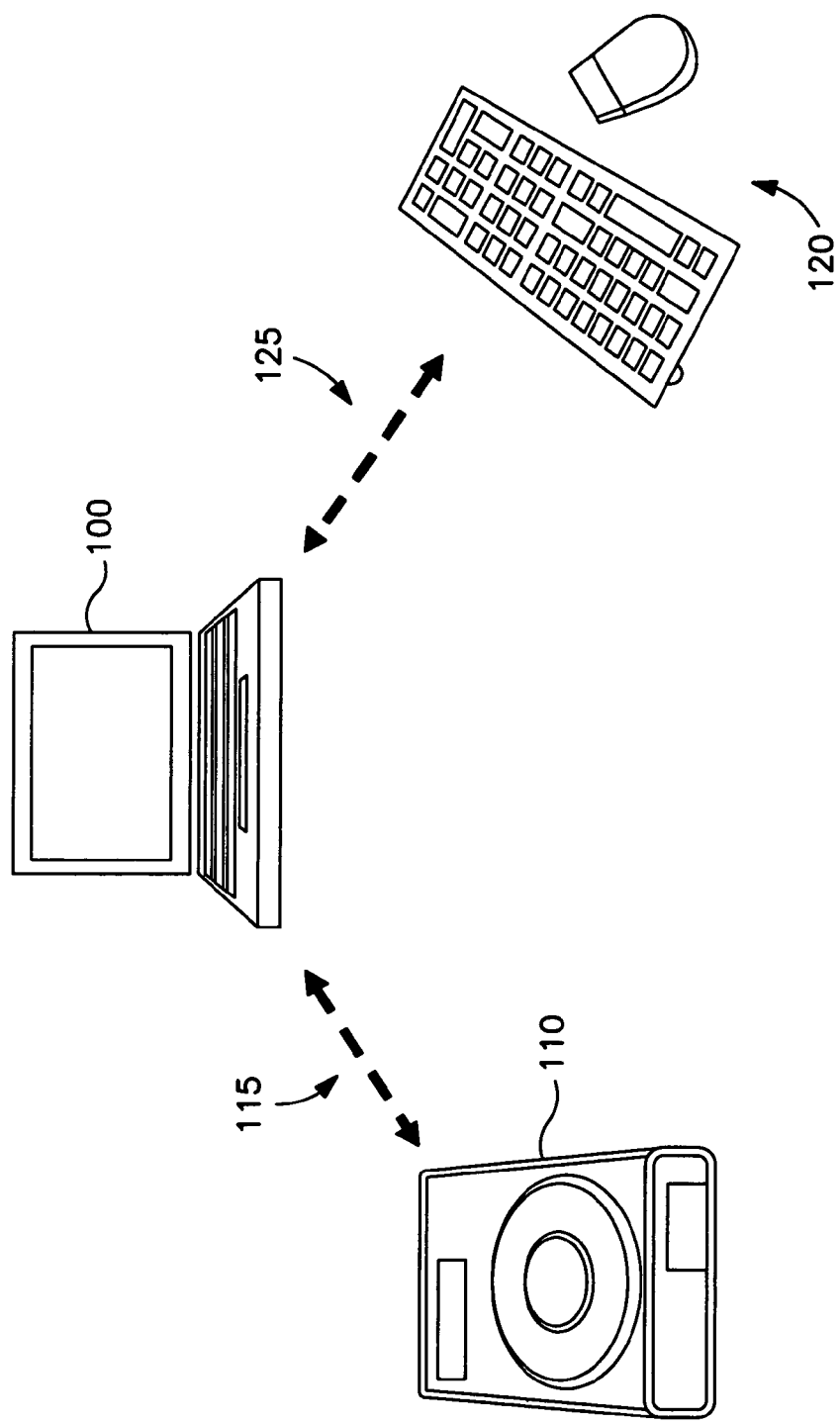
FIG. 1 is a functional block diagram illustrating an exemplary embodiment of a system useful in implementing an enhanced coexistence algorithm of the present invention.

Reference is now made to the drawings, wherein like numerals refer to like parts throughout.

Overview

The present invention discloses, inter alfa, methods and apparatus for compensating for the effects of interference between e.g., co-located air interfaces disposed on the same electronic or computing device. The methods and apparatus described herein utilize information (including for example the Receiver Signal Strength Index (RSSI) at the receiver for one of the multiple air interfaces of the device) to determine whether or not a modified spread-spectrum mapping should be executed. For example, in the context of an exemplary co-located WLAN and BT air interface, the existing adaptive frequency hopping (AFH) algorithm of Bluetooth is modified and optimized under the present invention so as to provide enhanced user experience over that which would otherwise be achievable in the aforementioned WLAN/BT use cases using traditional AFH. The enhanced AFH algorithm of the invention effectively lowers the isolation requirement needed between the interfaces on the computing device by implementing one or more "intelligent" management functions (e.g., avoiding certain frequency bands in proximity to the transmitter).

In addition, the system noise floor may also advantageously be measured and taken into account when providing for additional levels interference mitigation. For example, if the system noise floor exceeds a prescribed or dynamically determined threshold value, then additional measures such as the reduction of transmit power on one or more of the air interfaces can be implemented, such as via the transmission of control signals to one or more of the air interfaces.

Additional measurements of the system noise floor subsequent to the implementation of mitigation measures can also be obtained and compared against relevant criteria to determine whether additional mitigation methodologies (such as further reductions in transmit power, and/or turning off one or more transmit antennas in a MIMO system) are needed to provide a satisfactory experience for the user of the device.

Moreover, in the exemplary case of BT, the present invention recognizes that the "one size fits all" approach of extant AFH implementations (i.e., 22 MHz frequency shifts, regardless of platform specifics such as BT/WLAN antenna isolation, radiation patterns, efficiency, etc.) is insufficient and not optimized for these different configurations or for efficiency, and provides the ability to tailor interference mitigation techniques and parameters accordingly.

Business methods associated with the foregoing technology are also described herein.

Detailed Description of Exemplary Embodiments

Exemplary embodiments of the present invention are now described in detail. While these embodiments are primarily discussed in the context of a BT and WLAN (e.g., IEEE-Std. 802.11 Wi-Fi) coexistence scheme, it will be recognized by those of ordinary skill that the present invention is not limited to any two (or more) particular wireless protocols. In fact, the principles discussed herein are equally applicable to any number of wireless protocols which at least partly share frequency spectrum, and with which antenna isolation or spectrum bandwidth problems occur as a result of the two or more wireless protocol implementations being substantially co-located with one another.

For example, it is envisioned that digital media receivers in the future could potentially utilize both the WLAN (802.11) and wireless universal serial bus (USB) air interfaces. The WLAN and wireless USB interfaces would share the same spectrum (i.e., ISM band), and hence can also benefit from the coexistence solutions discussed subsequently herein.

Similarly, devices having Wi-Fi and WiMAX interfaces, whether with or without a PAN or BT interface, may also benefit. Similarly, a cellular data interface operating in the same spectrum (e.g., EV-DO or similar, such as the UM-150 broadband access device offered by Verizon™) can also benefit. Myriad other combinations of different air interfaces utilizing at least a portion of the same spectrum to which the present invention may be applied will also be recognized by the ordinary artisan given this disclosure.

Additionally, it will be appreciated that the methods and apparatus of the invention may be applied to situations where more than two interfaces are co-located or proximate, but not necessarily operated all at the same time. For instance, in one variant of the invention, a user device is configured with three (3) distinct air interfaces (labeled "A", "B" and "C" for purposes of this discussion), yet the most common operating mode for the user device is where only two of the three interfaces are operated simultaneously. Depending on which of the three interfaces are being operated at a given time, the policies or rules applied may be different. For example, interface A might have significant mutual interference issues with interface B, but not with interface C. Similarly, interface C might have significant issues with interface B, but not A. So, the present invention explicitly contemplates the dynamic selection and application of one or more operating policies or configurations based on a determination of which interfaces are operating at a given time.

Bluetooth AFH

AFH (Adaptive Frequency Hopping) allows Bluetooth to adapt to the environment by identifying fixed sources of interference, and excluding some channels associated with these sources from the list of available channels. This process of re-mapping also reduces the number of channels to be used, but not less than the required minimum (at least twenty channels).

The Bluetooth Specification does not describe how bad channels are to be identified ("Channel Assessment"). However, two primary methods for performing Channel Assessment with Adaptive Frequency Hopping are used: (i) RSSI (Received Signal Strength Indication), and (ii) PER (Packet Error Rate). PER (repeatedly testing and reassessing bad channels) is typically less accurate than RSSI, yet RSSI generally consumes more power than PER, and can also result in bandwidth being taken from other functions when there is a lack of available slots.

To further improve resilience against interferers like WLAN devices, AFH requires that Bluetooth devices communicate using the same channel. Normally, slaves respond using another channel than that used by the master. However, with AFH, both master and slave agree to use the "good" channels for communication. This avoids the master transmitting on a "good" channel while the slave responds on a "bad" one (or vice versa), and hence retransmissions.

The BT Link Manager Protocol (LMP) includes messages for communicating the bit mask that identifies which channels may be used and which are to be avoided in AFH.

The BT Host Controller Interface (HCI) includes commands to: (i) exclude certain channels from the list of possible channels, and (ii) to obtain the channel map currently in use.

As noted above, existing BT AFH implementations are effectively a "one size fits all" approach; i.e., manufacturers of extant BT protocol stacks and firmware do not adapt AFH to the particular platform (and combinations of components) on which it will be used. While BT AFH firmware in theory could be configured with some indigenous capability to consider factors such as RSSI, amplitude and frequency of the interferer(s), and packet size, it takes appreciable time to gather this data, evaluate it, and make necessary corrections. Conventional AFH uses the radio to listen for a certain period of time to understand the environment, then decides which channel is bad and to avoid; this has to be repeated periodically. Moreover, since BT interfaces are by design low power, such firmware cannot allocate too much time to constantly adjust or adapt to changing operational environments.

As will be described in greater detail below, the approach of the present invention advantageously uses software, and has pre-defined those channels that are "bad"; the BT module avoids these bad channels all of the time, as opposed to having to repeatedly decide which channels are bad, thereby simplifying and speeding operation.

Example Operation

One methodology useful to analyze and measure BT device performance (e.g. a mouse (MS)) includes monitoring the Packet Error Rate (PER) with the BT MS positioned at varying angles around the Device under Test (DUT); e.g., laptop computer. Varying WLAN data transmission rates are also utilized so that the relationship between WLAN data transmission rates as a function of BT MS positioning can also be understood. The PER is determined in one embodiment by capturing a log of all incoming Bluetooth packets using a software utility (e.g. Packetlogger™).

Figure 2:
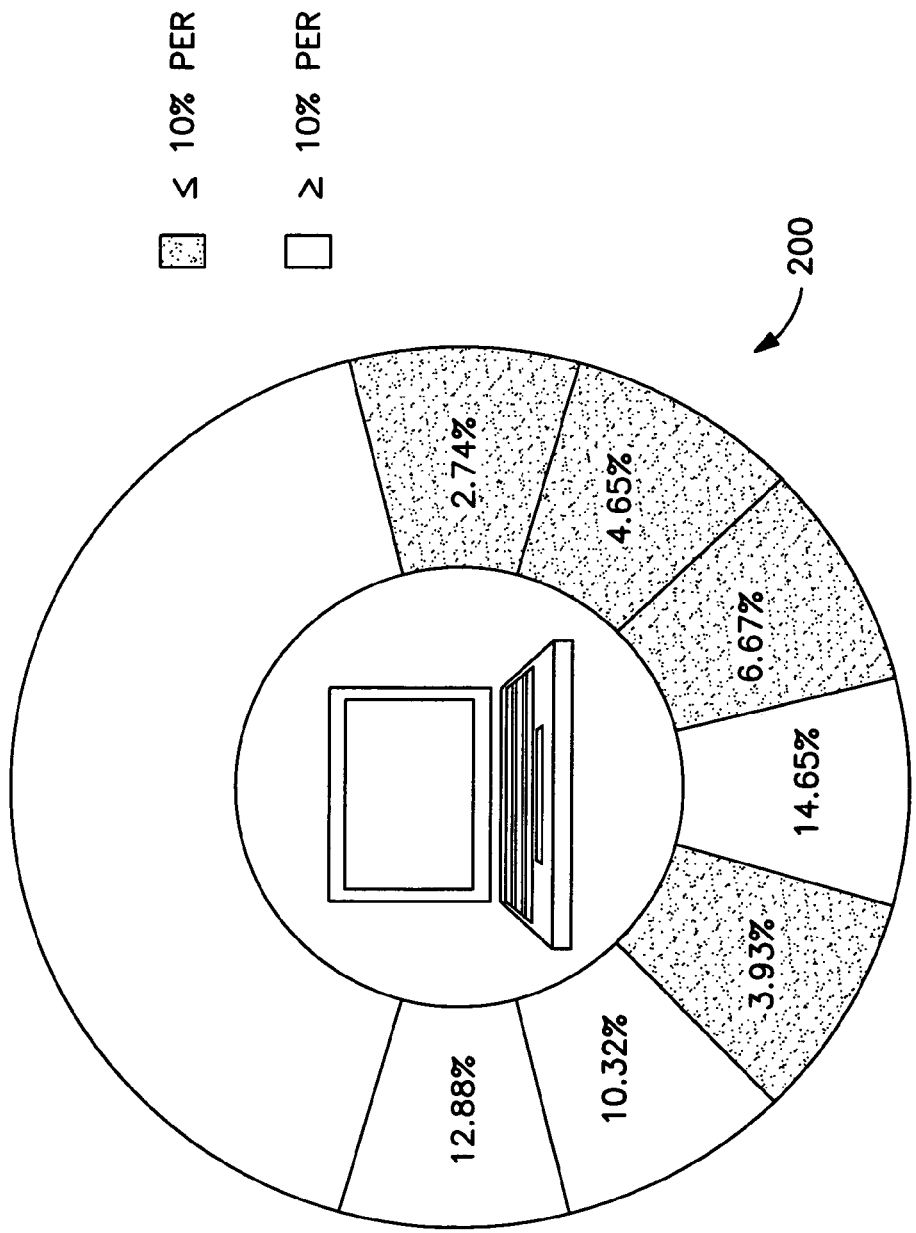
FIG. 2 is a graphical illustration of the packet error rate observed for a Bluetooth mouse as a function of position and WLAN transmission rate under the prior art.

Referring now to FIG. 2, the angular distribution of typical packet error rates 200 for a BT MS (e.g., a BT Mighty Mouse™ (M6) manufactured by the Assignee hereof) are illustrated, with a co-located WLAN transmitting at 30 Mbps, without the benefit of the interference mitigation technology of the present invention. Depending on the BT hardware that is utilized, BT packets are expected to arrive every 12.5 milliseconds. By utilizing modified firmware, each packet sent can also be assigned a unique sequential serial number. The PER can then be determined by monitoring the time differences between arriving packets as well as the serial number to determine whether packets are missing/lost, or are simply delayed. Using this method, PER values were determined by the inventors hereof at varying angles of azimuth around a typical computing device (e.g., laptop computer). The BT MS was set up to utilize a standard AFH scheme, as set forth in the BT Standard(s) (Bluetooth Core Specification v3.0+HS published Apr. 21, 2009; Bluetooth Core Specification Addendum 1 published Jun. 26, 2008; Bluetooth Core Specification v2.1+EDR published Jul. 26, 2007, and Bluetooth Core Specification v2.0+EDR published Nov. 10, 2004, each of the foregoing being incorporated herein by reference in its entirety).

Using an empirical PER threshold of 10% to determine whether BT MS performance is either "Good" or "Poor", the results of the aforementioned testing system are illustrated in FIG. 2. PER values below this 10% threshold have been found to result in smooth cursor motion for the user, whereas those above the threshold result in perceptibly slow or jerky cursor motion. As can be seen from the Figure, significant amounts of the user's "mouse space" are impacted by the high PER values, and these regions are generally not regular or predictable to the user.

Furthermore, it has been determined that as WLAN data transmission rates increase, PER associated with the MS also increases, as WLAN transmissions interfere with the BT module.

The PER threshold value of 10%, as set forth subsequently herein, will be recognized to be device dependent, such that the user of different devices and device peripherals can select or "tune" the PER threshold value observed to provide a "Good" user experience. Alternatively, different PER thresholds for different operating configurations or conditions can be implemented within the device and selectively utilized, as discussed in greater detail below.

Isolation Calculation

Figure 3:
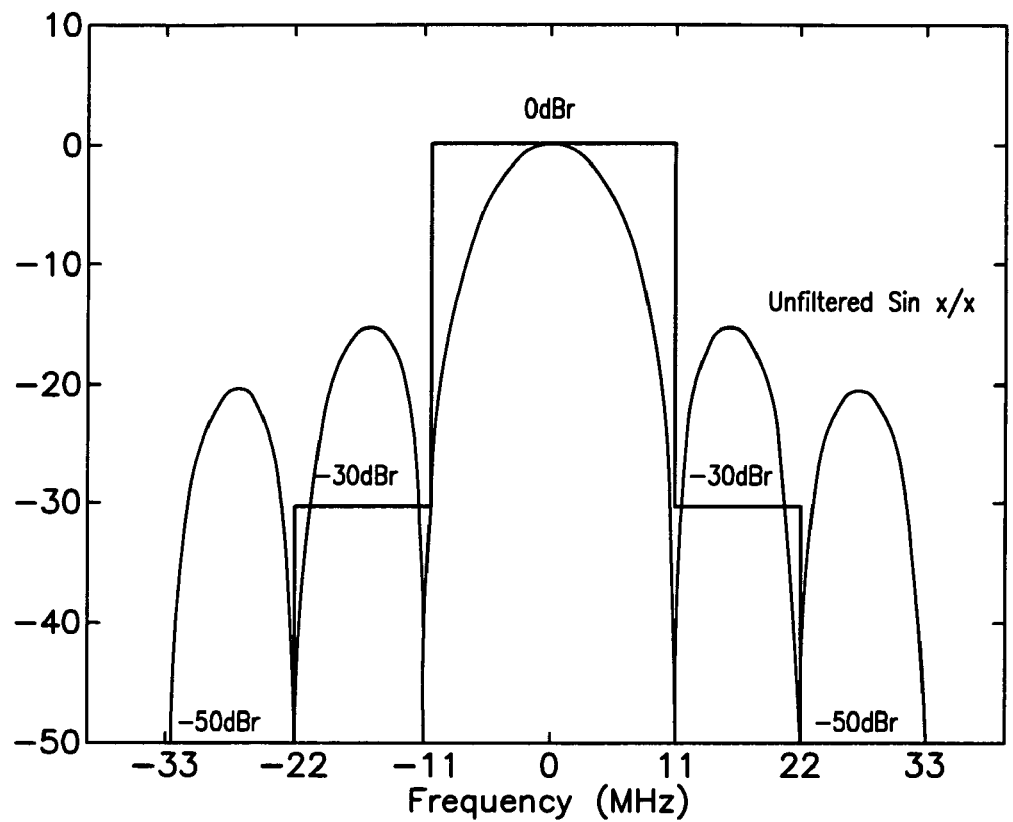
FIG. 3 is a graphical illustration of an IEEE 802.11b system spectrum mask (unfiltered) in accordance with one embodiment of the present invention.
Figure 4:
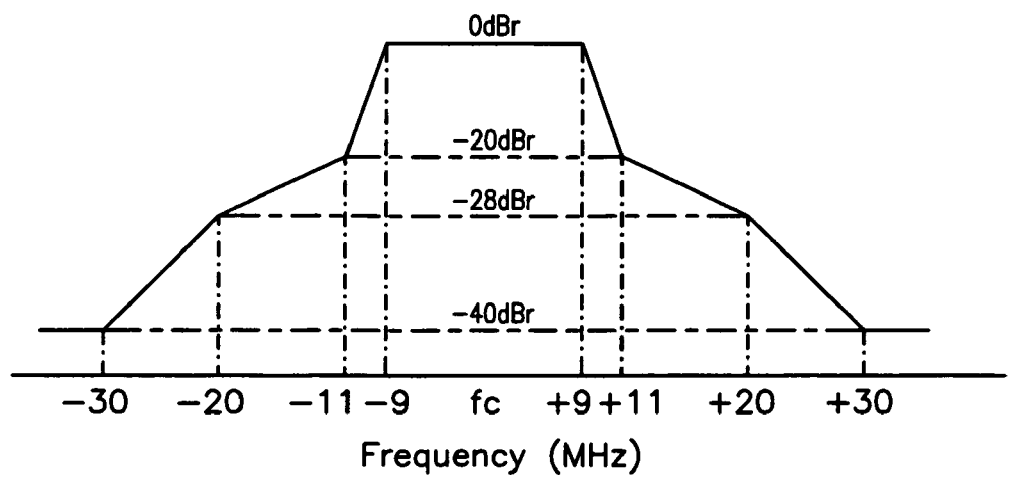
FIG. 4 is a graphical illustration of an IEEE 802.11a/g OFDM system spectrum mask in accordance with one embodiment of the present invention.
Figure 5:
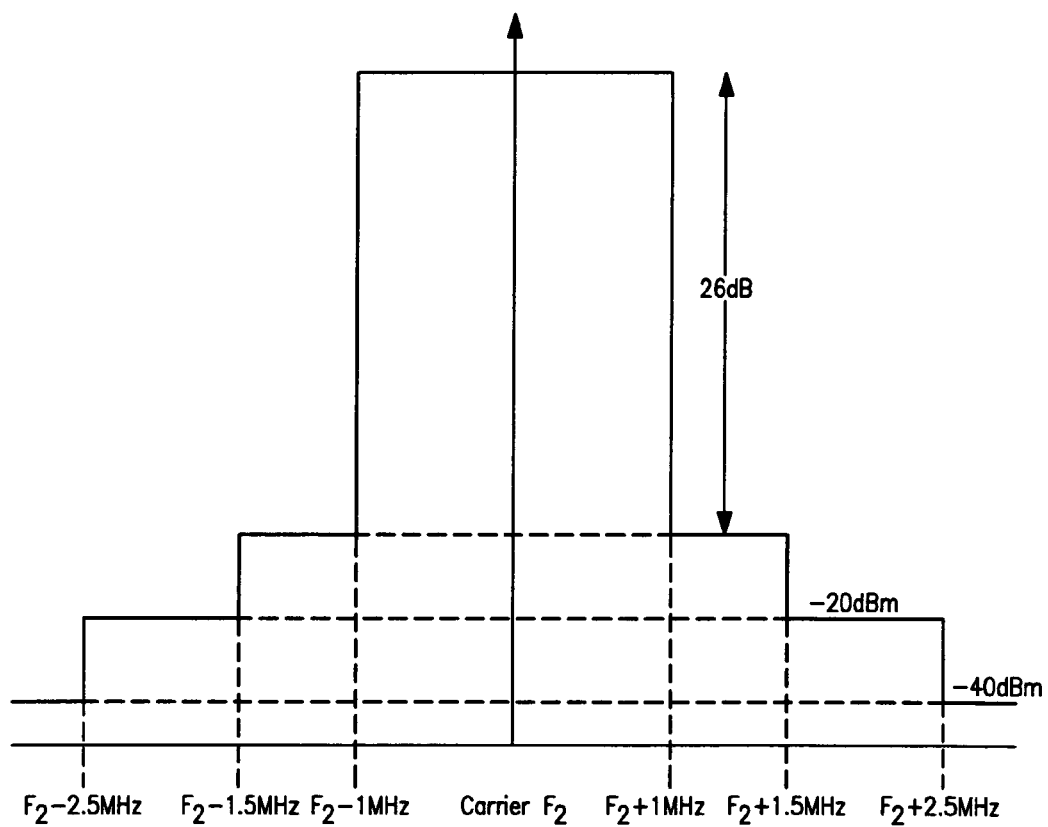
FIG. 5 is a graphical illustration of a Bluetooth transmitter system spectrum mask in accordance with one embodiment of the present invention.

Referring now to FIGS. 3-5, the out-of-band (OOB) emission requirements for both 802.11b/g/n and BT are shown and described in detail. With respect to FIGS. 3 and 4 (i.e., the spectrum mask for 802.11b and OFDM 802.11a/g, respectively), it is clear that even though WLAN is intended to transmit with a bandwidth of 22 MHz, the side band noise is quite significant. However, many commercial implementations (e.g., WLAN and BT ICs) have better performance than the OOB mask requirements set forth in their respective standards, thereby reducing the severity of the problem in some cases.

Referring now to Tables 1-3 below, the typical "ideal" isolation requirements based on current WLAN and BT IC vendor datasheets are illustrated. Using various RF parameters, along with the assumption that there is a 3 dB de-sense (i.e., 10 log 2=3 dB or ½ power) from the jamming radio ("jammer") to the jammed radio ("victim")—i.e., the noise from the jammer is the same as the receiver's noise floor—then the isolation requirements from WLAN to BT, and from BT to WLAN, are calculated as follows:

1. It is assumed that the WLAN (e.g., 802.11g/n) transmitter power is 15 dBm on average; since it has a bandwidth of 16.8 MHz, accordingly, so energy=15-10 log(16.8)=3 dBm/MHz.
2. 802.11g OOB emissions for the first side lobe is: -26 dBr, so the energy in the first side lobe is: 3 dBm/MHz-26 dBr=-23 dBm/MHz.
3. BT receiver sensitivity is -86 dBm on average; since SNR=11 dB is required, the BT receiver noise floor is -86 dBm-11 dB=97 dBm.
4. Assuming that the 802.11g/n radio will de-sense the BT radio by 3 dB, then the jammer noise floor will be equal to BT noise floor; i.e., -97 dBm.
5. The isolation requirement is thus calculated as: -23 dBm-(-97 dBm)=74 dB.

Table 1 below illustrates the isolation requirements for an 802.11b "jammer" and BT "victim", based on the foregoing exemplary calculation process.

TABLE 1

Isolation Requirements (WLAN 802.11b Tx, BT Rx)

| | 802.11b jammer, BT victim | BT skips 22 MHz | BT skips 44 MHz |
|---|---|---|---|
| 1 | OOB from 802.11b/g (dBm) | -27 | -47 |
| 2 | BT receiver sensitivity (dBm) | -86 | -86 |
| 3 | SNR (dB) | 11 | 11 |
| 4 | Receiver noise floor (-dBm) | -97 | -97 |
| 5 | 3-dB de-sense jammer noise (-dBm) | -97 | -97 |
| 6 | Isolation Requirement (dB) | 70 | 50 |

From Table 1, it is clear that if the BT radio can skip 44 MHz instead of 22 MHz in the WLAN band, the isolation requirement will be about 20 dB less (70 dB versus 50 dB).

Table 2 below illustrates the isolation requirements for an 802.11g "jammer" and BT "victim", based on the foregoing exemplary calculation process.

TABLE 2

Isolation Requirements (WLAN 802.11g Tx, BT Rx)

| | 802.11g jammer, BT victim | BT skips 22 MHz | BT skips 40 MHz | BT skips 60 MHz |
|---|---|---|---|---|
| 1 | OOB from 802.11g (dBm) | -23 | -32 | -37 |

TABLE 2-continued

Isolation Requirements (WLAN 802.11g Tx, BT Rx)

| | 802.11g jammer, BT victim | BT skips 22 MHz | BT skips 40 MHz | BT skips 60 MHz |
|---|---|---|---|---|
| 2 | BT receiver sensitivity (dBm) | −86 | −86 | −86 |
| 3 | SNR (dB) | 11 | 11 | 11 |
| 4 | Receiver noise floor (−dBm) | −97 | −97 | −97 |
| 5 | 3-dB de-sense jammer noise (−dBm) | −97 | −97 | −97 |
| 6 | Isolation Requirement (dB) | 74 | 65 | 60 |

Note that in the fourth column in Table 2 (BT skips 60 MHz), the concept is the same, but it is clear that the isolation requirement reduces to 60 dB, as the third side lobe from the WLAN radio is 14 dB further down on the signal spectrum.

Table 3 below illustrates the isolation requirements for a BT "jammer" and 802.11b/g/n "victim", based on the foregoing exemplary calculation process. For Table 3, the calculation is based on a BT transmitter power and OOB emission as obtained from a working device.

TABLE 3

Isolation Requirements (BT Tx, WLAN 802.11b/g/n Rx)

| | BT jammer, 802.11b/g/n victim | WLAN Rx in +/−2.5 MHz | WLAN Rx >=2.5 MHz away |
|---|---|---|---|
| 1 | OOB from BT (dBm) | −23 | −37 |
| 2 | KT, thermal noise density (dBm/Hz) | −174 | −174 |
| 3 | 802.11g BW (MHz), 10 log(16.8), dB | 72 | 72 |
| 4 | Receiver noise floor (−dBm) | 5 | 5 |
| 5 | 3-dB de-sense jammer noise (−dBm) | −97 | −97 |
| 6 | Isolation Requirement (dB) | 74 | 60 |

Note that in Table 3, movement of the WLAN receiver outside of 2.5 MHz of the BT jammer reduces the isolation requirement from 74 dB to 60 dB.

As described in greater detail subsequently herein, the foregoing knowledge of isolation requirements behavior as a function of various parameters is leveraged within the exemplary embodiments of the invention in order to, inter alia, enhance performance of the BT radio under the desired use cases (e.g., significant WLAN transmissions).

Methods

Figure 6:
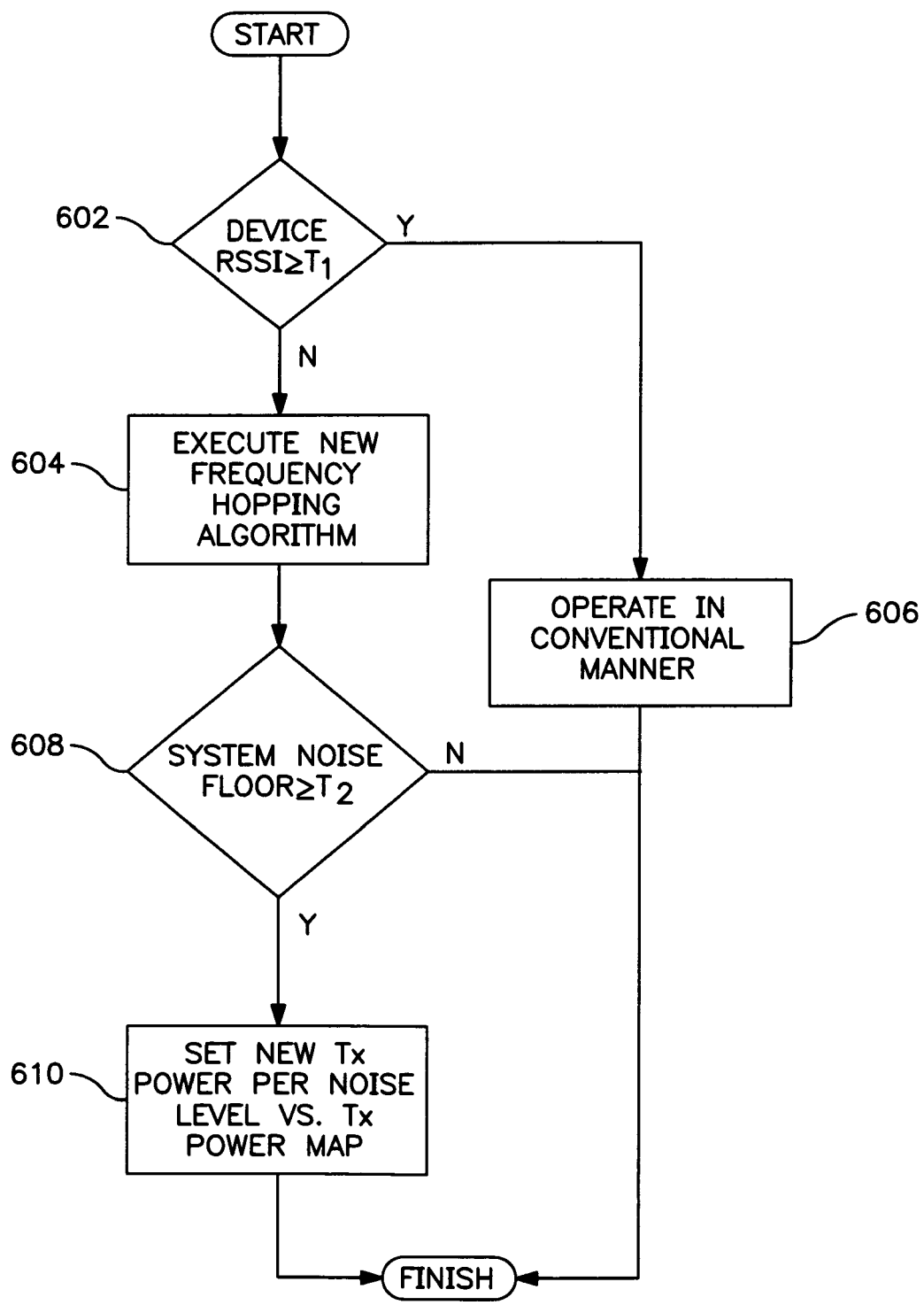
FIG. 6 is a process flow chart illustrating one embodiment of a generalized method for implementing an enhanced coexistence algorithm in accordance with the principles of the invention.

Referring now to FIG. 6, one exemplary embodiment of the generalized method of compensating for the effects of interference between multiple air interfaces located on a computing device is disclosed. At step 602, the Receiver Signal Strength Index (RSSI) is determined at the receiver network interface (e.g. at the built-in radio of the receiver) for one of the multiple air interfaces of the device. The RSSI is then compared against a predetermined threshold value. If the RSSI exceeds the predetermined threshold value at step 602, the computing device operates in a conventional manner per step 606. However, if the device RSSI does not exceed the predetermined threshold value at step 602, then an enhanced compensation (e.g., frequency hopping) algorithm is executed at step 604.

At step 604, the enhanced frequency hopping algorithm (EAFH) of the invention is executed so as to lower the isolation requirement between the multiple air interfaces on the computing device (as compared with prior art techniques), thereby providing a good user experience for the user of the computing device. In one embodiment, the EAFH comprises logic (whether in the form of software, firmware, hardware, or combinations thereof) which implements the functionality described with respect to Tables 1-3 above; e.g., implements a hopping algorithm which skips 44 MHz.

It is recognized that while AFH is primarily contemplated in the context of BT, the use of frequency hopping has broader applicability to other air interface protocols as well. The use of frequency hopping generally has the drawback of shrinking the available bandwidth; however, it can be useful in dealing with noise and interference across numerous air interface protocols.

At step 608, the system noise floor is compared against a second predetermined threshold. If the noise floor does not exceed this second predetermined threshold, then it is expected that the multiple air interfaces of the device are not interfering with each other enough to significantly affect user experience. However, if the system noise floor does exceed the second predetermined threshold, then further noise mitigating methodologies should be implemented.

Figure 7:
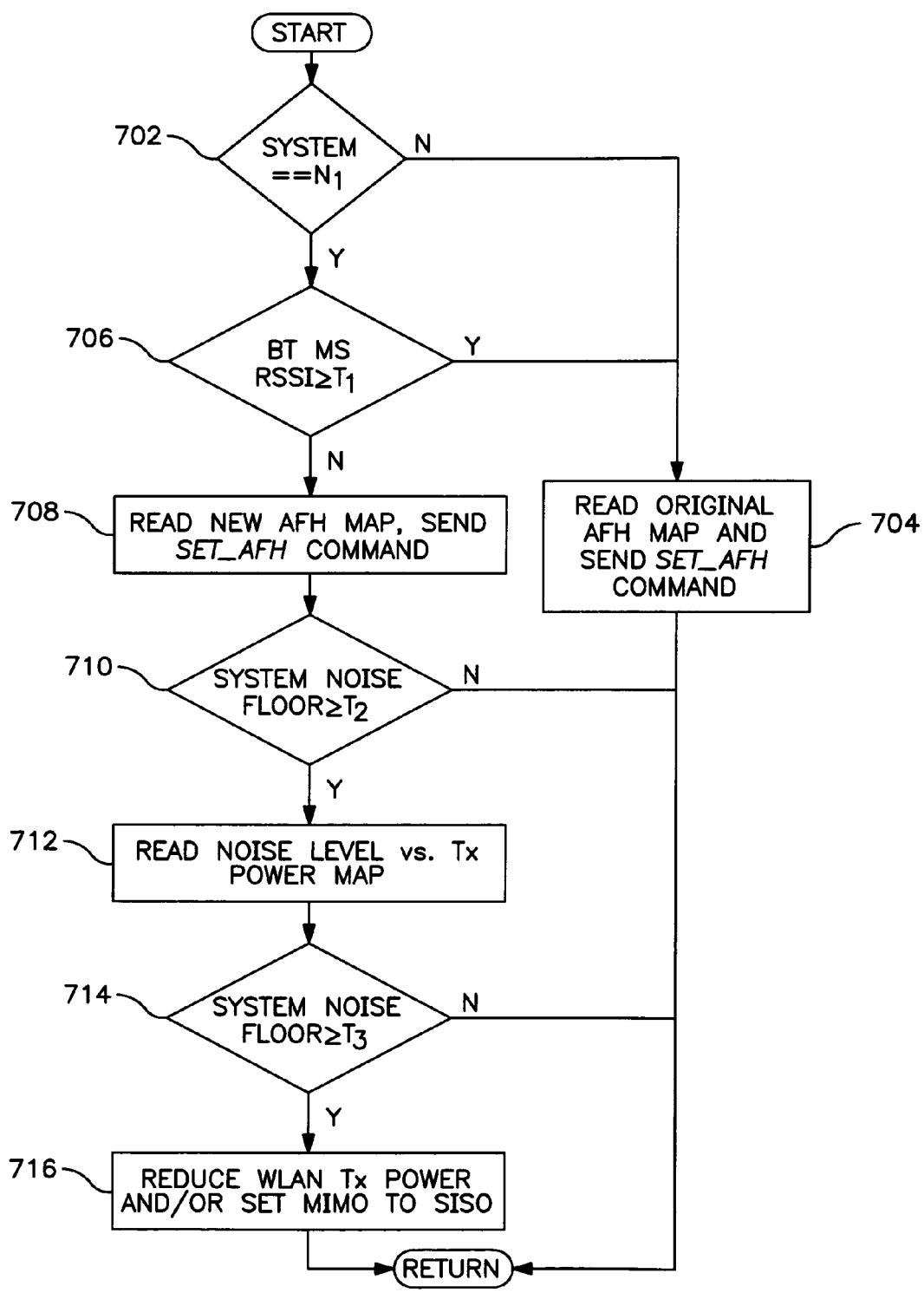
FIG. 7 is a process flow chart illustrating one embodiment of a WLAN/BT enhanced adaptive frequency hopping algorithm in accordance with the principles of the present invention.

Referring now to FIG. 7, one exemplary implementation of the generalized method of FIG. 6, as applied to a communications system incorporating a WLAN and a BT air interface is disclosed. FIG. 7 illustrates an EAFH algorithm, although it will be appreciated that other types of "corrective" or "avoidance" algorithms may be modified according to the present invention, AFH merely relevant to the exemplary WLAN/BT context now described.

At step 702 of the method of FIG. 7, it is determined whether the devices that are part of the system satisfy a predetermined criterion. For example, the methodology described herein may only be useful with compliant devices. These compliant devices include a list of portable computing devices (e.g., Apple MacBook® Pros and others), as well as a list of compliant peripheral devices (e.g., Apple BT Mighty Mouse (M6) and others). If this criterion is met (i.e., the devices of the system are compliant with implementing the advanced interference mitigation methodology described herein), then the process advances to step 706. Otherwise, the system operates in a conventional manner by reading the original AFH map and transmitting the SET_AFH command at step 704.

In addition, it can, in certain implementations, be determined whether or not multiple air interfaces operate in an overlapping spectrum (e.g., whether a WLAN interface operates in the 2.4 GHz spectrum also utilized by a BT interface). In addition, determinations such as whether a BT peripheral device is connected, or whether a scheduled WLAN transmission is occurring, can be utilized as an input or condition(s) precedent for a first-level determination whether or not any steps need to be taken to mitigate interference.

Next, per step 706, the BT MS RSSI is compared against a predetermined or dynamically set threshold value (or respective values for each of the multiple criteria where used). This comparison may be purely numeric in nature; e.g., measured value A is greater than, less than, or equal to its relevant threshold, and can be accomplished for example using a simple comparison algorithm. Alternatively, the variables or values may be evaluated by a human to identify any additional artifacts or information. For instance, a series of measurements of isolation between two antennas under varying external/environmental conditions may yield more information that just a direct "greater-than/equal-to/less-than" type comparison, since the changes in the measured isolation values might correlate to one or more external/environmental variables. The variables used may also be fuzzy in nature (e.g., "high", "medium", "low" or the like). Various different approaches to assessing the relationship between one or more measured values and their relevant acceptance/decision criteria will be recognized by those of ordinary skill given the present disclosure, and accordingly are not described further herein.

If the relevant threshold is met or exceeded (i.e., the RSSI of the BT MS exceeds the threshold) per step 706, the first operational policy is implemented per step 704. This policy includes (in the present WLAN/BT embodiment) reading the original AFH map, and sending the SET_AFH command to the BT MS. If the RSSI of the BT MS does not exceed the predetermined threshold at step 706 (indicating a low received signal strength, and hence potentially WLAN interference), then the present methodology mitigates or compensates for the effects of such interference by operating according to a set of rules which are based on a certain operating criteria of the system. Specifically, at step 708, a new AFH mapping is read from memory (see Table 4 below), and executed by transmitting a SET_AFH command containing the new AFH mapping. See also discussion of FIGS. 3-5 supra.

TABLE 4

Exemplary Enhanced AFH Map

| WLAN Active Channel | | Frequencies to Block | | Available Channels | | |
|---|---|---|---|---|---|---|
| Channel | $F_c$ | Start | End | Low | High | Total |
| 1 | 2412 | $F_c - a_1$ | $F_c + b_1$ | 0 | $N_1$ | $0 + N_1$ |
| 2 | 2417 | $F_c - a_2$ | $F_c + b_2$ | 0 | $N_2$ | $0 + N_2$ |
| 3 | 2422 | $F_c - a_3$ | $F_c + b_3$ | 0 | $N_3$ | $0 + N_3$ |
| 4 | 2427 | $F_c - a_4$ | $F_c + b_4$ | $M_4$ | $N_4$ | $M_4 + N_4$ |
| 5 | 2432 | $F_c - a_5$ | $F_c + b_5$ | $M_5$ | $N_5$ | $M_5 + N_5$ |
| 6 | 2437 | $F_c - a_6$ | $F_c + b_6$ | $M_6$ | $N_6$ | $M_6 + N_6$ |
| 7 | 2442 | $F_c - a_7$ | $F_c + b_7$ | $M_7$ | $N_7$ | $M_7 + N_7$ |
| 8 | 2447 | $F_c - a_8$ | $F_c + b_8$ | $M_8$ | $N_8$ | $M_8 + N_8$ |
| 9 | 2452 | $F_c - a_9$ | $F_c + b_9$ | $M_9$ | $N_9$ | $M_9 + N_9$ |
| 10 | 2457 | $F_c - a_{10}$ | $F_c + b_{10}$ | $M_{10}$ | $N_{10}$ | $M_{10} + N_{10}$ |
| 11 | 2462 | $F_c - a_{11}$ | $F_c + b_{11}$ | $M_{11}$ | 0 | $M_{11} + 0$ |
| 12 | 2467 | $F_c - a_{12}$ | $F_c + b_{12}$ | $M_{12}$ | 0 | $M_{12} + 0$ |
| 13 | 2472 | $F_c - a_{13}$ | $F_c + b_{13}$ | $M_{13}$ | 0 | $M_{13} + 0$ |
| 14 | 2484 | $F_c - a_{14}$ | $F_c + b_{14}$ | $M_{14}$ | 0 | $M_{14} + 0$ |

Figure 10:
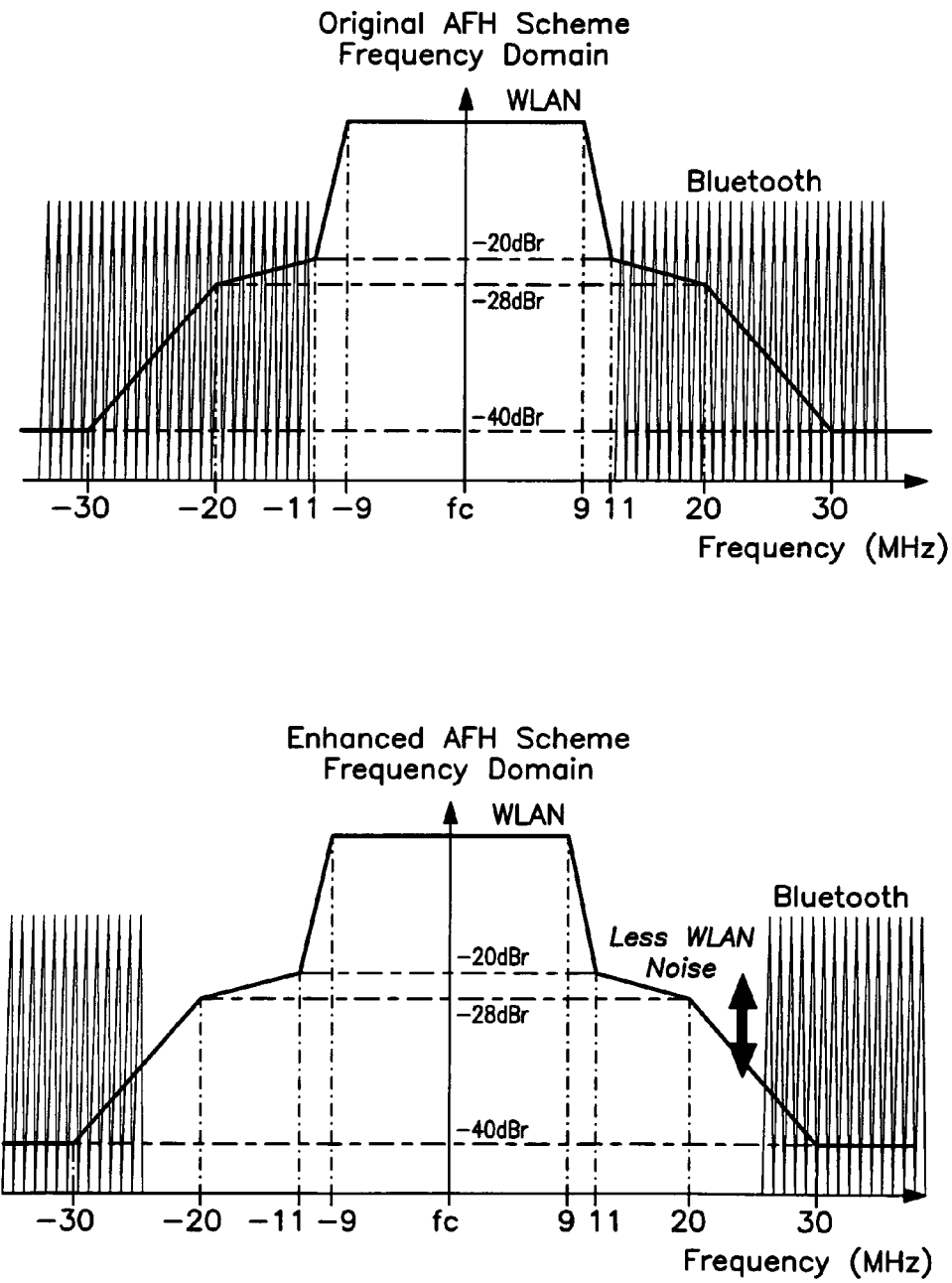
FIG. 10 is a graphical illustration comparing a prior art AFH scheme in the frequency domain versus an enhanced AFH scheme in accordance with one embodiment of the present invention.
Figure 11:
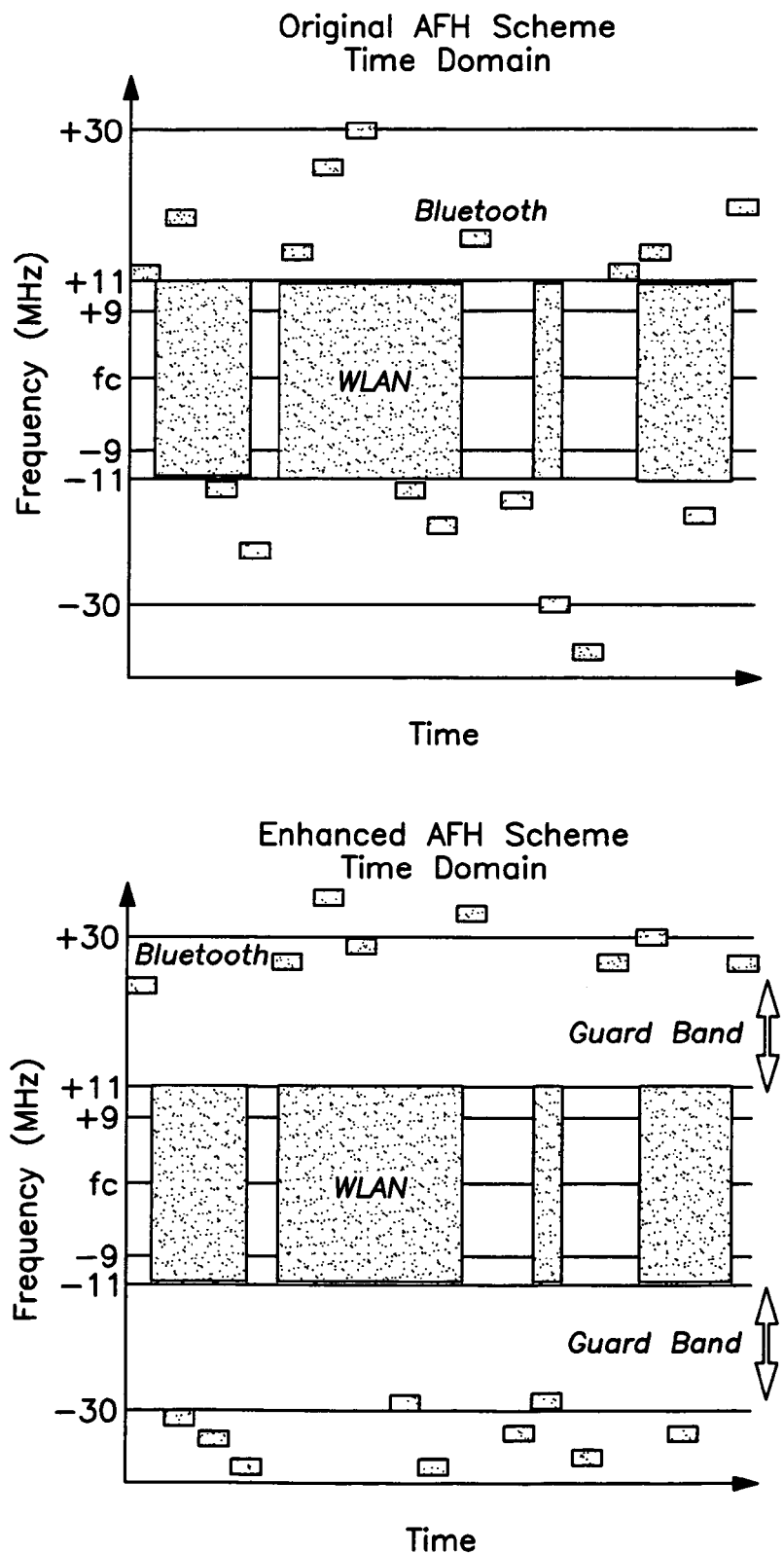
FIG. 11 is a graphical illustration comparing a prior art AFH scheme in the time domain versus an enhanced AFH scheme in accordance with one embodiment of the present invention.

FIGS. 10 and 11 illustrate an exemplary embodiment of the operational characteristics of a system implementing the EAFH map of, e.g. Table 4 above. FIG. 10 illustrates that when utilizing the EAFH scheme, when viewed in the frequency domain, the available BT channels are pushed away from the center frequency of the active WLAN channel, so as to mitigate interference with the side-lobes of the latter. FIG. 11 illustrates the same operational characteristic viewed from a time domain perspective. Specifically, using the EAFH scheme introduces a "guard band" in the frequency domain between the active WLAN channel and respective BT channels operating in coexistence with the WLAN radio.

This determination and comparison of RSSI is, in one embodiment, performed relatively infrequently (i.e., during device power up, or when the BT MS is detected at a portable computing or electronic device). Alternatively, the RSSI of the BT MS in the system may be dynamic, thereby: (1) requiring periodic measurements of RSSI in the system in order to dynamically determine the operating rules of the system used to compensate for the effects of interference; (2) requiring RSSI measurements for each of the dynamic cases (as well as various ones of devices utilized) during product development in order to determine the operating rules of the system: in each of those cases; and/or (3) estimating RSSI for each of the dynamic cases based on a limited subset of measurements during development of the system.

Furthermore, with respect to options (2) and (3) above, these predetermined or estimated RSSIs are, in an exemplary embodiment, determined as a function of the components determined to be part of the system at step 702. For instance, based on the detected system or component configuration, different values or rules may be selectively applied. As another example, such a dynamic system may comprise a laptop computer which implements both Bluetooth and WLAN modules. The Bluetooth and WLAN modules may have a variable geometry in relation to one another; e.g., the Bluetooth module may be situated in the movable monitor/display portion of the device, while the WLAN module may be implemented in the base of the laptop. Hence, depending on the relative positioning of the modules (i.e., due to the relative positioning of the monitor with respect to the base on the laptop), different RSSI or other values may be obtained or estimated for the system. During product development of the laptop, RSSI measurements may be taken with the monitor positioned at a plurality of different positions with respect to the base of the laptop. These measurements can then be stored for example in a table in memory, or via another data storage approach. During operation, the relative positioning of the laptop monitor can be determined using any number of well-known means (e.g., a sensor which determines the relative angle between the monitor portion and base, user input, etc.), and the appropriate entry read from the table.

In another variant, the foregoing laptop computer may be configured and optimized for "lid open" (i.e., display portion folded open) or "lid closed" (display portion folded down and locked to base) situations, such that the optimization algorithm will detect one of these two conditions, and apply the appropriate policy dynamically.

Dynamic corrections may also conceivably be necessitated by other factors, including for example: (i) the placement of the device with respect to other nearby radiators in the relevant frequency range(s); or (ii) the use of other equipment within the device itself that might affect the isolation of the two air interfaces in question (e.g., a third air interface that potentially interferes with one of the two first interfaces, other sources of electromagnetic radiation or noise, etc.).

Moreover, the selected threshold values may be changed, and even made dynamic or variable themselves, such as being dependent on a given operational mode (e.g. WLAN transmission rate), application, or environmental condition. The threshold values may also be of different measurements or units (e.g., dBi, dBm, etc.).

At step 710, the system noise level is, in an exemplary embodiment, measured using the built-in radio of the device and compared against a predetermined threshold value after implementing the new AFH map at step 708. If the system noise level is determined to be below the predetermined threshold value, then it is safe to assume that the new AFH map implemented will be effective in maintaining an acceptable level of user experience. Conversely, if the system noise level is higher than the predetermined threshold value, then additional measures need to be taken to mitigate the effects of interference potentially affecting user experience. These additional mitigation methodologies are executed starting at step 712.

It is noted that as above for the RSSI threshold(s), the noise threshold(s) may be static or dynamic in nature as well (e.g., a higher noise floor can be tolerated for a stronger signal).

It is further noted that the exemplary implementation of FIG. 7, which includes noise level analysis in addition to RSSI, addresses the shortcomings of applying the prior art "Golden Range" approach (i.e., BT RSSI from −40 dBm up to −65 dBm) to the situation where both the platform and environmental noise are also increasing. Stated differently, this prior art approach is not sophisticated enough to account for noise level variations, and hence is inapplicable in the use case scenarios described herein. This represents a salient advantage of the present invention over the prior art.

At step 712, the noise level determined at step 710 is read against a transmission power map. This transmission power map is indicative of what level of transmitter power can be utilized under the observed system noise conditions, while still providing an acceptable (or greater) level of user experience. After reading the transmission power map, a SET_Tx_power command is issued to the transmitting radio air interface(s). The transmission power map will, in an exemplary embodiment, take into account user experience for multiple ones of the air interfaces. For example, in the exemplary WLAN and BT air interface scenario, the transmission power map takes into account how reducing the WLAN transmission power will affect both the user experience with the WLAN application, as well as the user experience with the BT application.

Instead of simply determining the minimum level of acceptable user experience for one of the air interfaces and adjusting the other air interface accordingly, the exemplary transmission power map takes into account both air interfaces. This is particularly important where a decrease in transmission power only affects the user experience for the non-transmitting air interface marginally, while significantly affecting the transmitting air interface. While taking into account user experience for both air interfaces is desirable in many embodiments, it is recognized that it may be desirable to take into account the user experience for only a single one of the air interfaces for purposes of, for example, reducing transmission power map complexity.

The transmission power map can also be configured to take into account the applications currently being utilized on those air interfaces in certain implementations. For example, not all applications require the same level of emphasis for a given air interface. In the context of BT, the transmit power of the WLAN may provide an unacceptable level of user experience for a BT mouse, but provide an adequate or good level of user experience for a BT keyboard. Conversely, data backup applications for the WLAN air interface may not be as susceptible to poor user experience as an application which transmits a streaming video image to a remote display. These and other applications can be taken into account by a given transmission power map.

In another embodiment of the invention, instead of (or in conjunction with) a transmission power map as set forth above, the device may utilize a "data rate map" which implements a data throttling algorithm on the transmitter (e.g., WLAN). As previously noted with respect to FIG. 2, PER on the BT mouse of the test setup has been shown to increase as WLAN data rate increases. Accordingly, instead of (or in conjunction with) reducing transmitter power, a map or mask of allowable data rates can be imposed in the case where EAFH alone is insufficient to reduce PER sufficiently.

At step 714 of the method of FIG. 7, the system noise floor is again compared against a criterion subsequent to the implementation of the updated transmission power (per the transmission power map setting obtained at step 712). This processing step is useful in determining, inter alia, whether previous mitigation steps taken have been successful in accomplishing the goal of providing a good user experience for each of the involved air interfaces. If so, the methodology ends, as the negative effects of interference have been successfully mitigated. The process is then subsequently repeated at step 702 which can either be periodically repeated, or triggered at some point in the future by a detected event or operating condition.

If at step 714 the system noise floor does meet or exceed a given criterion or criteria, then further mitigation steps need to be taken.

At step 716, the transmitter power control for the WLAN module is turned on and the Transmitter (Tx) power is adjusted (e.g., reduced) if necessary to mitigate interference. In addition, the BT or WLAN module optionally turns on its receiver saturation detection and avoidance feature to further compensate for the interference. For example, in one variant, a power level table is stored in the device memory, and the optimization algorithm of the invention can send down a command to establish a desired power level so as to mitigate/avoid saturation.

Alternatively (or in addition), if the WLAN system is a multiple-in multiple-out (MIMO) system, one or more transmitters can be shut down on the WLAN, thereby further mitigating the adverse effects of interference (e.g. operating the MIMO system as a single-in single-out (SISO) system).

It will be recognized that various other combinations and logical flows of the foregoing mitigation efforts or approaches can be implemented according to the invention. For example, it is appreciated that instead of first implementing the EAFH algorithm (step 708) followed by reducing the WLAN Tx power (step 716), this order can be reversed (i.e., step 716 is implemented prior to the implementation of step 708). However, such a reversal of order may not be optimal in all considered design situations.

It has also been recognized by the inventors hereof that asymmetries relating to direction of packet flow may exist with respect to PER. Hence, while the foregoing test setup of FIG. 2 (and certain embodiments herein) are described in the context of a BT device (mouse) transmitting packets to the host (e.g., laptop computer), transmission of packets from host to peripheral, or transmission in both directions, may be effectively managed using the present invention. In cases of such asymmetry, the algorithm(s) and parameters applied to transmissions in one direction (e.g., peripheral to host) may be different from those in the opposite direction. Hence, the present invention contemplates the use of algorithms that are transmission direction-specific.

Figure 8:
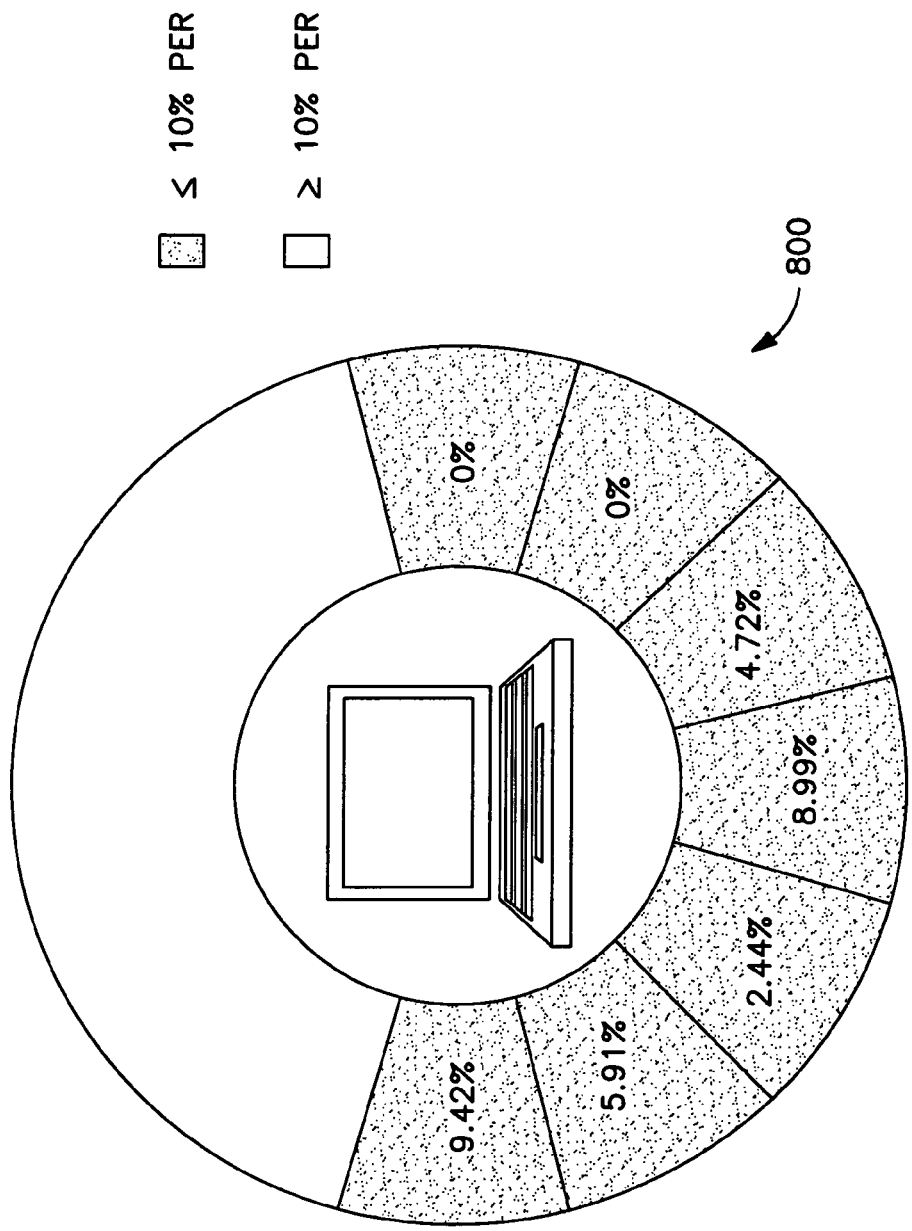
FIG. 8 is a graphical illustration of the packet error rate observed for an exemplary system implementing the methodology of FIG. 7.

FIG. 8 illustrates an angular distribution of PER values for a BT mouse relative to a computer, similar to FIG. 2 discussed above. However, in the system 800 of FIG. 8, the enhanced AFH (EAFH) algorithms described previously herein have been employed. As can be seen, the implementation of the EAFH algorithms of the invention has significantly reduced the PERs associated with various angular displacements, in some cases by as much as 5%. Most notably, all PERs have been reduced to below 10%, the criterion for "good" user experience.

It is noted that the improved PER performance of FIG. 8 also overcomes many of the limitations or restrictions of prior art approaches for device or air interface co-existence. For example, time-sharing co-existence (i.e., where the interfaces share the available time and frequency resources to mitigate interference) have multiple salient restrictions, including requiring signaling between the interfaces to be considered and laid out before the design of the device is conducted. Moreover, due to the complexity and number of usage cases, additional signals between the interfaces are required. In contrast, the methods of the present invention can be implemented entirely in software if desired, thereby reducing signaling between the interfaces (and even eliminating hardware-based signaling). Time sharing also has significant performance restrictions in that the air interfaces are not operated simultaneously (as is the case with the exemplary inventive methodologies described herein), resulting in potentially lower throughput and poor user experience.

Apparatus

Figure 9:
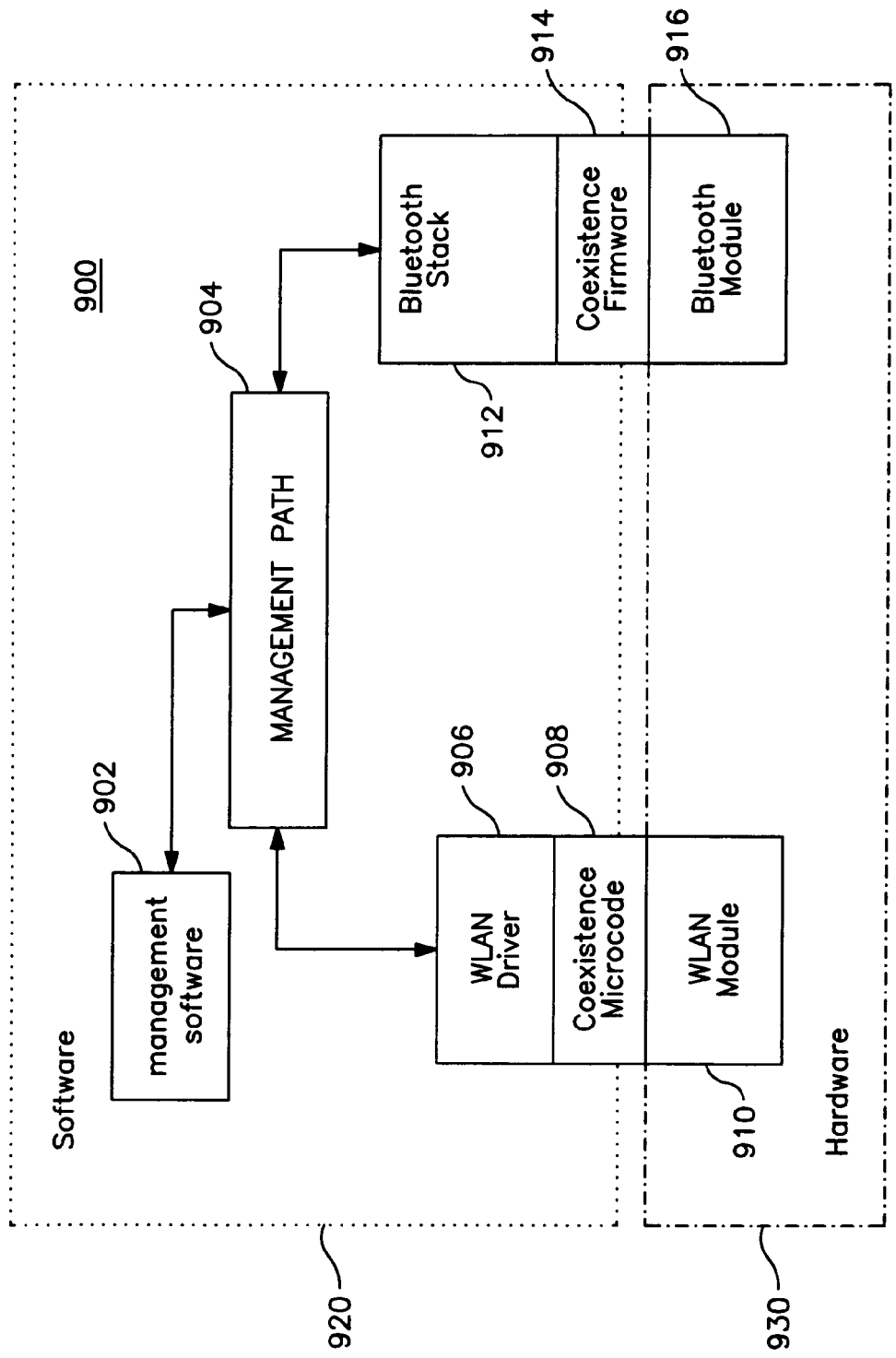
FIG. 9 is a functional block diagram illustrating one embodiment of a multi-air interface enabled apparatus (e.g. WLAN and BT) utilizing interference mitigation in accordance with the present invention.

Referring now to FIG. 9, an exemplary apparatus 900 implementing multi-air interface (e.g., WLAN/Bluetooth) interference mitigation features is shown and described in detail. The apparatus 900 of FIG. 9 will generally be implemented within a single client device (e.g., laptop computer, smartphone, etc.) such that the WLAN module 910 and the Bluetooth module 916 are substantially co-located with one another, thereby introducing system interference as a result of, inter alia, poor antenna isolation. However, it will be recognized that the different modules may also reside in different physical devices which themselves are proximate to one another.

The apparatus 900 shown in FIG. 9 comprises combined software 920 and hardware 930 elements which together compensate for the interference caused by having both the air interfaces (e.g., WLAN module 910 and Bluetooth module 916) operating in close spatial proximity to one another. The software portion 920 of the apparatus 900 comprises management software 902, a WLAN driver 906, and coexistence microcode 908 for WLAN, as well as a Bluetooth stack 912, and coexistence firmware 914 for Bluetooth. A management path 904 between the software portions of the WLAN and Bluetooth portions as well as the management software 902 of the system 900 is also provided. In one variant, the aforementioned management path 904 comprises a software interface (e.g., API) of the type well known in the software arts, although other approaches may be used as well.

The management software 902 can provide a plurality of management functions such as, implementing a power saving mode (PSM), reducing the transmit power for the WLAN module 910, and reducing the amount of transmit antennas utilized in MIMO systems of the type previously described herein. Furthermore, the management software also is responsible for executing the EAFH algorithms (including the new AFH map for the BT module 916). The WLAN driver 906 is in communication with the management software 902. As is well known, the WLAN driver 906 acts as a communication interface between higher level computer processes (such as the management software 902) with the WLAN hardware. The WLAN module 910 itself acts as the physical hardware necessary to implement the WLAN functionality.

It will be appreciated that while the exemplary implementation of FIG. 9 (i.e., WLAN and BT) benefits primarily from the WLAN reducing its transmit power (and not the reverse, since the BT transmit power is so low in comparison), other implementations where the transmit power of the two (or more) air interfaces are more equal can benefit from one or both of the air interfaces implementing transmit power control. Similarly, if each of the air interfaces in such an implementation use MIMO, benefits can be obtained in some cases by allowing each of the interfaces to implement SISO operation, versus just the WLAN interface in the device of FIG. 9.

On the Bluetooth side of the illustrated apparatus, the Bluetooth software stack 912 comprises an implementation of the Bluetooth protocol (see, e.g., Bluetooth Core Specification v2.1+EDR dated Jul. 26, 2007 {Bluetooth SIG}, previously incorporated herein) allowing flexible implementation of a plurality of different Bluetooth profiles. These profiles can include for example software for a Bluetooth enabled headset, or for a Bluetooth enabled I/O device such as a keyboard or mouse; see, e.g., Bluetooth Advanced Audio Distribution Profile 1.2 dated 16 Apr. 2007; Bluetooth Audio/Video Remote Control Profile 1.3 16 Apr. 2007; Bluetooth Basic Imaging Profile (BIP) 25 Jul. 2003; Bluetooth Basic Printing Profile (BPP) 1.2 27 Apr. 2006; Bluetooth Common ISDN Access Profile (CIP) 16 Nov. 2002; Bluetooth Cordless Telephony Profile (CTP) 22 Feb. 2001; and Bluetooth Device Identification Profile (DI) 1.3 26 Jul. 2007, each of the foregoing incorporated herein by reference in its entirety).

The Bluetooth stack 912 is further in communication with coexistence firmware 914 which is communicates with the Bluetooth module 916. The Bluetooth module 916 further comprises the Bluetooth radio hardware.

Another feature of the apparatus 900 of FIG. 9 is the software communications management path 904 between WLAN and Bluetooth. This is significant in that it permits the implementation of a closed-loop solution between the WLAN module 910 and the Bluetooth module 916. In the illustrated embodiment, this management path 904 permits Bluetooth to read the WLAN channel as well as permit management software to send signals from the new AFH map to the Bluetooth module 916. While the present embodiment illustrates bidirectional communications path between WLAN and Bluetooth, it is further envisioned that in some embodiments it may be desirable to have this software communications path 904 be one-way, or alternatively decoupled such that it is only in communication with the management software 902. Moreover, other types of management inputs are envisioned, including for example inputs as to the status of other modules or processes within the host device.

It will also be recognized that the aforementioned embodiment of the management path 904 comprises a software interface, which necessarily induces an appreciable latency as compared to an effectively real-time "signal path". Hence, the present invention contemplates the use of multiple information paths as required; i.e., a management path for commands or information which can tolerate some degree of latency, and a signal path for more instantaneous or real-time signal communications (the latter which may be effected for example using a single or multi-conductor bus, etc.).

Methods of Doing Business

In another aspect of the invention, methods of doing business relating to the aforementioned apparatus and operational methods are disclosed.

In one embodiment, the method comprises providing (e.g., selling for consideration) portable computers such as laptops, PDAs, smartphones, or other client devices or services (e.g., the Apple TV™ set-top box and service provided by the Assignee hereof) that have been optimized based on their measured radio frequency interface characteristics; e.g., which incorporate the interference mitigation mechanisms described previously here. This may be accomplished for example via the Internet (e.g., using an on-line configuration interface or "wizard" which allows the customer to configure their prospective device according to any number of different options), or by a technician. The configured device is optimized according to for example the methodology of FIG. 7 based on its measured RSSI for the BT peripheral devices as well as the underlying system noise floor as previously described herein.

In another variant, the particular configuration and type of environment in which the device will be predominantly used can be supplied by the requesting consumer, thereby allowing at least some degree of device-specific or customized evaluation and optimization. For instance, if the predominant use of the device will be with a BT mouse only in an open-air environment where multi-path interference, Rayleigh fading, or other such physical phenomena are not as significant, then the optimization applied may conceivably be different than that applied where the same unit was intended to be predominantly used in a high multi-path/high fade environment with other BT components. Hence, the present invention contemplates in general the "tuning" of a particular device configuration for use in a particular environment and set of operating conditions.

In another aspect of the invention, consumers may bring back their already purchased client devices (e.g., laptops, smartphones, etc.) for or after reconfiguration so as to have them "re-optimized" for the new configuration. Alternatively, the user's device may be configured with its own indigenous evaluation/optimization capability as previously described. For example, a laptop user might install a Wi-Fi card themselves if their production device was not so equipped. With the new card, there may be significant interference with another existing or co-installed air interface such as Bluetooth, hence requiring optimization according to the methods described herein. The computer manufacturer, the user themselves, or a third party distributor/repair facility, could then measure the relevant parameters associated with the device and peripherals, and adjust the computer (e.g., program the indigenous algorithm already resident on the computer previously described with EAFH) to optimize operation of the interfaces (and the device as a whole) so as to perform mitigation of interference.

Alternatively, it will be recognized that the client device and algorithm may be configured to perform this step automatically; e.g., by sensing the presence or addition of new hardware (e.g., Wi-Fi card), and then conducting a parametric evaluation (or prompting the user to do so, such as via a third party). Once the data is obtained, whether manually or automatically, the optimization algorithm can use this data to select the best operational EAFH policy or policies for that particular configuration.

Moreover, it will be recognized that the use of the software-based approach of the present invention provides additional benefits in terms of customization of individual types of platforms (or even individual platforms themselves). Specifically, even though most prior art BT chip/software vendors attempt to use software-based AFH to avoid WLAN channels, they can only apply the "one AFH scheme fits all" approach previously described, since they do not have design cognizance over the entire platform (e.g., portable computer or smartphone). By integrating the manufacture of the software and hardware in one vendor (such as the Assignee hereof), an optimal EAFH implementation can be designed for each platform (i.e., the EAFH can be customized based on platform, antenna, WLAN and BT chips RF characteristics, etc.). This level of customization and device "personalization" is not possible under the prior art.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A wireless device, comprising:
a processing apparatus;
at least two differing wireless network interfaces that operate in at least a partially overlapping frequency band, at least one of the at least two differing wireless network interfaces operating according to a multiple-in multiple-out (MIMO) protocol; and
a computer readable apparatus having a storage medium with at least one computer program stored thereon, the at least one computer program comprising a plurality of computer executable instructions that are configured to, when executed by the processing apparatus:
determine whether the wireless device is in an environment in which a first threshold for a system noise floor is exceeded;
when the first threshold is exceeded, adjust a transmit power for at least one of the at least two differing wireless network interfaces;
determine whether the wireless device is in an environment in which a second threshold for the system noise floor is exceeded; and
when the second threshold is exceeded, turn off at least one channel associated with the at least one wireless network interface operating according to the MIMO protocol.

2. The device of claim 1, wherein the at least two differing wireless interfaces comprise a Wireless Local Area Network (WLAN) interface and a Bluetooth interface, and the at least one computer program is further configured to:
measure a received signal strength using at least one of the interfaces;
evaluate the measured signal strength using one or more criteria; and
based at least in part on the evaluation, implement a modified adaptive frequency management protocol.

3. The device of claim 2, wherein the at least one computer program further comprises a plurality of computer executable instructions that when executed by the processing apparatus:
utilize an adjusted channel map associated with an adaptive frequency hopping function of the Bluetooth interface.

4. The device of claim 3, wherein the adjusted channel map comprises an adjusted portion of selected frequencies of the map to maintain an increased frequency difference from a center frequency associated with the WLAN interface relative to that of the adaptive frequency hopping function without such adjustment.

5. The device of claim 1, wherein the at least one computer program further comprises a plurality of computer executable instructions that when executed by the processing apparatus:
adjust the frequency utilization of at least one of the at least two differing wireless network interfaces.

6. A wireless device, comprising:
a processing apparatus;
at least two differing wireless network interfaces that operate in at least a partially overlapping frequency band; and a computer readable apparatus having a storage medium with at least one computer program stored thereon, the at least one computer program comprising a plurality of computer executable instructions that are configured to, when executed by the processing apparatus:

determine whether one of the at least two wireless network interfaces has a receiver signal strength index (RSSI) that exceeds a first criterion;

when the first criterion is exceeded, read a first frequency utilization map for the one of the at least two wireless network interfaces, otherwise read a second frequency utilization map for the one of the at least two wireless network interfaces;

determine whether the wireless device is in an environment in which a first threshold for a system noise floor is exceeded;

when the first threshold is exceeded, adjust a transmit power for at least one of the at least two differing wireless network interfaces;

when the transmit power is adjusted, determine whether the wireless device is in an environment in which a second threshold for the system noise floor is exceeded; and when the second threshold is exceeded, modify the operation of the at least one of the at least two differing wireless network interfaces.

7. The device of claim 6, wherein the modified operation comprises turning off at least one channel associated with the at least one wireless network interface operating according to a Multiple-Input Multiple-Output (MIMO) protocol.

8. The device of claim 6, wherein the modified operation comprises further adjusting the transmit power for the at least one of the at least two differing wireless network interfaces.

9. The device of claim 6, wherein the modified operation comprises a modified adaptive frequency management protocol.

10. The device of claim 6, wherein the at least two differing wireless network interfaces comprise a Wireless Local Area Network (WLAN) interface and a Personal Area Network (PAN) interface.

11. The device of claim 6, wherein the modified operation comprises an adjustment to frequency utilization of at least a first one of the two differing wireless network interfaces.

12. A method for reducing interference in a wireless coexistence system, the wireless coexistence system including at least two differing wireless network interfaces that operate in at least a partially overlapping frequency band, the method comprising:

determining a receiver signal strength index (RSSI) at the wireless coexistence system;

determining a noise floor associated with the wireless coexistences system; and implementing a coexistence algorithm to reduce interference in the wireless coexistence system based at least in part on the determined RSSI and determined noise floor;

wherein the at least two wireless interfaces comprise a Wireless Local Area Network (WLAN) interface and a Bluetooth interface, and the act of implementing a coexistence algorithm comprises adjusting a channel map associated with an adaptive frequency hopping function of the Bluetooth interface.

13. The method of claim 12, wherein the adjusting of the channel map comprises adjusting the selected frequencies of the map to maintain an increased frequency difference from a frequency associated with the WLAN interface relative to that of the adaptive frequency hopping function without such adjustment.

14. The method of claim 12, wherein the implementing the coexistence algorithm further comprises adjusting a frequency utilization of at least one of the at least two differing wireless network interfaces.

15. The method of claim 12, wherein the implementing the coexistence algorithm further comprises adjusting a transmitter power of a transmitting one of the at least two wireless network interfaces.

16. The method of claim 12, wherein the coexistence algorithm further comprises imposing a data rate mask or limitation on a transmitting one of the at least two wireless network interfaces.

17. The method of claim 12, wherein the implementing the coexistence algorithm further comprises adjusting a Multiple-Input Multiple-Output (MIMO) protocol of the WLAN interface.

18. A method of operating a device having first and second air interfaces so as to mitigate interference therebetween without imposing time-sharing restrictions on either of the interfaces, the method comprising:

determining a received signal strength using at least one of the interfaces;

determining a noise parameter using at least one of the interfaces; and based at least on the acts of determining, selectively implementing a frequency use mapping for the first interface that substantially avoids one or more emitted sidebands associated with transmission from the second interface;

wherein the first interface comprises a Personal Area Network (PAN) interface, the second interface comprises a Wireless Local Area Network (WLAN) interface, and the frequency use mapping comprises a mapping which allows only certain prescribed channels.

19. The method of claim 18, wherein the method further comprises:

after the selectively implementing, determining again the noise parameter;

evaluating the again determined noise parameter; and based at least in part on the evaluation, implementing at least one of: (i) transmitter power reduction on the WLAN interface; and/or (ii) changing the mode of operation of the WLAN interface from multiple-in, multiple-out (MIMO) to single-in, single-out (SISO).

20. The method of claim 18, where the frequency use mapping further comprises an adaptive frequency management protocol.

21. The method of claim 18, where the frequency use mapping further comprises adjusting a frequency utilization of at least one of the first and second air interfaces.

* * * * *